Feb. 27, 1962  VAN H. MONTGOMERY  3,022,917
THREADED METAL CLOSURE CAP FOR A CONTAINER
Filed Oct. 2, 1958
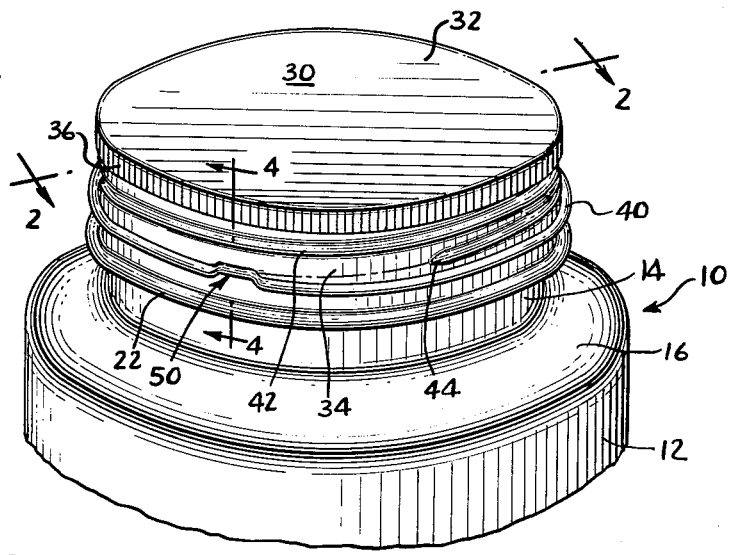
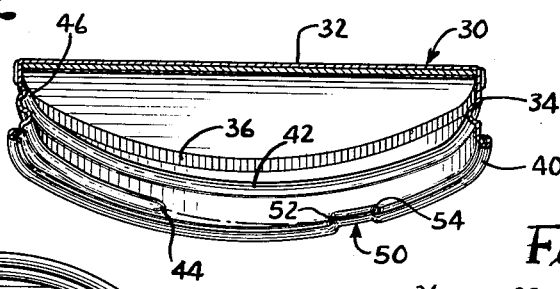
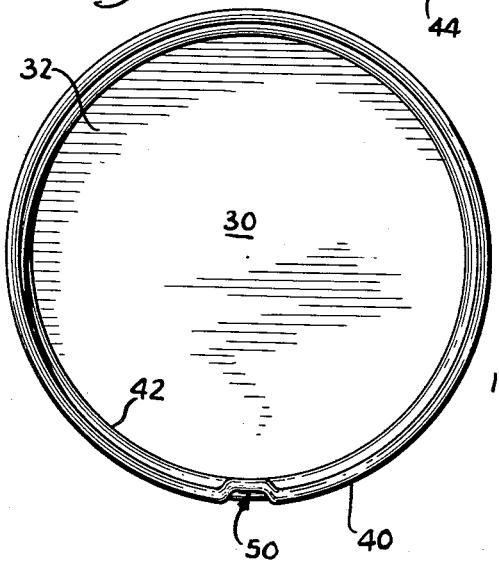
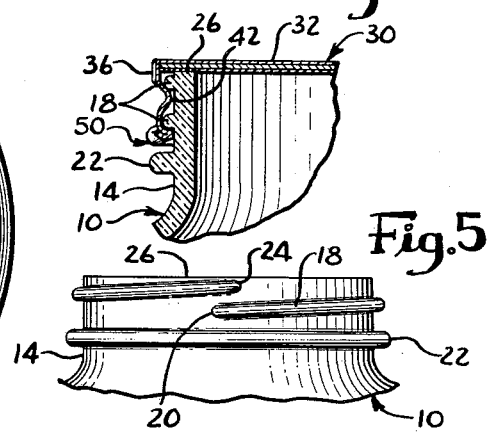
INVENTOR
VAN H. MONTGOMERY
by: Norman Gerlach
ATTY.

United States Patent Office 3,022,917
Patented Feb. 27, 1962

3,022,917
THREADED METAL CLOSURE CAP
FOR A CONTAINER
Van H. Montgomery, Evansville, Ind., assignor to Bernardin Bottle Cap Company, Inc., Evansville, Ind., a corporation of Indiana
Filed Oct. 2, 1958, Ser. No. 764,830
1 Claim. (Cl. 215—44)

The improved closure cap comprising the present invention has been designed for use primarily in connection with the sealing of glass bottles, flasks, jars and similar containers. The invention is however capable of other uses and, if desired, closures constructed in accordance with the principles of the present invention may be employed in connection with containers which are formed of material other than glass, as for example, metal or plastic containers.

The invention is specifically concerned with bottle or jar closures which are of circular design and have a marginal depending apron portion provided with inpunched, pressed or rolled helical threads designed for making sliding engagement with a corresponding number of external helical threads provided on the neck or rim region of the glass container whereby the cap may be threaded onto the container and brought to a "home" position wherein the top or crown portion of the closure moves into coextensive sealing engagement with the annular rim of the container opening and whereby the closure is securely fastened in sealing position.

The threads which are provided upon commercial molded containers are not of uniform contour nor are they uniformly smooth throughout their respective lengths, the discrepancies arising not only in connection with containers which are derived from a common source. As a consequence, closures, which are seldom manufactured for a specific container but rather for a class of containers, are frequently found to be incapable of use on certain containers because of an imperfect fit with the threaded portions of the containers, the discrepancies at times being such that the closure cannot be started upon its threaded engagement with the container.

Another limitation that is attendant upon the use of present day conventional threaded closures for glass containers resides in the fact that after the closure has been applied to the container a relatively large area of intimate metal to glass contact along the length of the thread or threads provided on these members becomes effective to maintain the closure in its closed position over the rim of the container. Where the container is employed for the packaging of certain viscous substances such as food porducts which are tacky and possess adhesive qualities as for example syrups, thick condiments such as chili sauce, catsup, chutneys, orange marmalade, and other fruit preserves, and the like, the drying out of spillage on the threaded neck of the container often creates an intimate bond between the mating threads so that the torque required to remove the closure is often far greater than that which is capable of being applied by manual means.

The present invention is designed to overcome the above noted limitations that are attendant upon the use of conventional threaded closures for glass containers and, toward this end, it contemplates the provision of a novel form of closure wherein a greater effective thread length is attained without appreciably increasing the extent of intimate metal to glass contact between the threads on the closure and glass container respectively.

The provision of a closure of this character being among the principal objects of the invention, another object is to provide such a closure having a thread thereon which fades into the general cylindrical surface of the closure apron at a region adjacent to the lower rim of the apron in the usual manner, and which is provided with means for guiding the leading end of the thread into mating engagement with the corresponding thread on the glass container so that there will be no tendency for mismating of the threads or "cocking" of the closure on the container during application of the former to the latter.

A still further object of the invention is to provide a receptacle closure in which the guiding means referred to above serves the additional function of reinforcing the threaded engagement between the parts so that a materially greater degree of torque must be applied to the closure before thread stripping or rupture takes place. In other words, it is an object of the invention to provide a threaded metal closure for glass containers wherein the degree of torque required to effect stripping of the threads is well beyond the amount of torque that can manually be applied to the closure, whether finger pressure along is relied upon or whether conventional torque applying tools are employed.

Yet another object of the invention is to provide a threaded closure of the character briefly outlined above wherein the effective thread length is appreciably greater than the actual thread length involved, the greater effective thread length being attained without increasing the height of the closure flange or apron so that there will be no danger of the apron "shouldering" on the annular glass bead ordinarily provided a short distance below the mouth of conventional glass containers.

With these and other objects in view, which will become more readily apparent as the nature of the invention is better understood, the same consists in the novel construction, combination, and arrangement of parts shown in the accompanying single sheet of drawings forming a part of this specification.

In these drawings:

FIG. 1 is a fragmentary side and top perspective view of a metal closure constructed in accordance with the principles of the present invention and showing the same operatively applied to the filling opening of a glass container;

FIG. 2 is a fragmentary sectional perspective view taken substantially on the vertical plane indicated by the lines 2—2 of FIG. 1;

FIG. 3 is a top plan view of the closure;

FIG. 4 is a fragmentary sectional view taken substantially on the vertical plane indicated by the lines 4—4 of FIG. 1; and FIG. 5 is a fragmentary side view of the upper portion of the glass container which is shown in FIG. 1.

Referring now to the drawings in detail and in particular to FIGS. 1 and 4, a container, which has been fragmentarily designated at 10, is in the form of a glass jar having a body portion 12, a neck portion 14 and a connecting shoulder portion 16. These parts are cylindrical in horizontal cross section and the neck portion 14 is shown as being provided with a single external helical rib or screw thread 18, the thread 18 is preferably, but not necessarily, continuous from end to end and its leading end 20 fades into the general cylindrical confines of the neck portion 14 at a region near the usual glass bead 22 ordinarily provided on conventional jars near the base of the neck portion. The trailing end of the continuous thread 18 fades as at 24 into the cylindrical confines of the neck at a region adjacent to the extreme rim or mouth 26 of the jar. The circumferential extent of the thread 18 is slightly greater than 360° so that the end regions of the thread overlap each other as clearly shown in FIG. 5, the extent of overlap being approximately 30° or less in a circumferential direction.

The closure of the present invention is designated in its entirety at 30 and is in the form of a cap which is drawn from thin metal and which comprises a circular, preferably flat, disc-like top or crown portion 32 from the marginal regions of which there depends a generally cylindrical side flange or apron 34. The portion of the apron 34 adjacent to the crown 32 may be knurled as at 36 to enhance the frictional characteristics of the closure for manual closure twisting operations. Seated within the cap 30 in coextensive face-to-face contact with the inside surface of the crown portion 32 is a liner or gasket in the form of a flat sealing filler disk 38 of circular configuration. The disk or gasket may be formed of wax paper, pulp board, cork, felt, a suitable plastic or other material.

The lower circular rim of the depending apron 34 is formed with an outwardly rolled rim 40 and forms what is commonly known as a bead or wire edge, the same serving to rigidify the apron and reinforce the apron rim.

Formed in the apron 34 intermediate the lower bead 40 and the crown portion 32 is a screw thread 42 which, like the screw thread 18 has overlapping vertically displaced ends 44 and 46 which fade into the general cylindrical contour of the apron 34 at circumferentially spaced regions, the ends 44 and 46 subtending an intervening arc in the neighborhood of 45°. The end 44 terminates at a region spaced forwardly from and close to the bead 40 while the end 36 terminates at a region contiguous to the knurled portion 36. The screw thread 42 differs from conventional threads in that it does not "run off" the lower rim, so to speak, of the apron 34 but instead terminates a short vertical distance therefrom and also terminates an appreciable circumferential distance from the point of intersection between an imaginary extension of the thread helix and the lower rim of the apron 34.

According to the present invention, at the above referred to point of intersection between the helix extension and the lower rim of the apron 34, the bead 40 is deformed inwardly of the cap with a small increment of upward displacement being imparted to the deformation by the displacement dies during the forming operation. This deformation of the bead 40 provides a small inwardly and upwardly directed lug 50 which, because it is formed in the turned bead, is of extremely rigid construction. The extent of circumferential displacement will, of course, depend upon the pitch angle of the thread 42, and for a conventional closure cap constructed according to the G.C.M.I. height specifications, the angle involved by the displacement is approximately 45°. In addition to effecting inward and upward displacement of the bead 40 to produce the lug 50, a slight angular displacement such as has been indicated in FIG. 2 by the angle θ is involved wherein the end 52 of the lug 50 is slightly higher than the end 54 thereof.

The displaced lug 50 functions during application of the closure or cap 30 to the container neck 14 as a pilot element to guide the thread fadeout 44 into proper threaded engagement with the glass thread 18 so that as twisting torque is applied to the cap as a whole, the thread fadeout 44 will pass beneath the glass thread fadeout 24 and insure proper orientation between the cap 30 and container neck 14 at the inception of the threaded engagement between these parts. In other words, the lug 50 assures proper starting of the threaded engagement so that the cap will not become cocked on the neck 14 with the threads 18 and 42 being mis-mated.

The lug 50 additionally serves to materially increase the effective thread length of the thread 42 so that a stronger union and a better seal will exist when the cap 30 is moved to its home position on the neck with the sealing filler or disk 38 seated on the container rim 26.

The fact that the lug 50 is displaced slightly upwardly as previously described affords a greater reaction force resisting the application of torque to the cap after the latter has been turned to its home position on the neck 14. Because the lug is slightly inclined as previously described, the lug is in approximate alignment with the extended thread helix for the thread 42 so that smooth engagement of the lug beneath its cooperating glass thread on the container neck 14 will be attained. Finally, since the effective length of the thread 42 is increased without an actual increase in the extent of threaded contact between the closure thread and the container thread, no additional binding or adhesive action is encountered when disengaging the closure from the container arising from solidification of food or other substances on the surfaces of the mating threads.

The invention is not to be limited to the exact arrangement of parts shown in the accompanying drawing or described in this specification as various changes in the details of construction may be resorted to without departing from the spirit of the invention. For example, while the invention has been shown and described herein as being applied to a closure member designed for use in sealing the filling openings of glass containers having a single screw thread on the neck portion thereof, it is within the purview of the invention to apply the same to containers wherein the neck portions thereof have dual or triple threads, in which instances the effective length of each thread may be increased by deforming the apron-bead at appropriate regions therearound in conformity with the disposition of the various thread ends. Only insofar as the invention has particularly been pointed out in the accompanying claim is the same to be limited.

Having thus described the invention what I claim as new and desire to secure by Letters Patent is:

A metal closure cap for a container having a threaded neck portion, said cap having a crown portion and a depending apron provided with a circular bead surrounding its lower rim, a filler disk disposed within the cap in face-to-face contact with the peripheral regions of the crown portion, said apron being formed with an inwardly displaced elongated helical thread of small thread pitch, said thread being disposed wholly within the vertical confines defined by said crown portion and bead and terminating at its lower end above the level of said bead, said bead being formed by a displacement of the metal of the bead bodily both radially inwardly and axially upwardly from its normal cylindrical confines through a limited circumferential extent thereof at the juncture region between the bead and an imaginary linear extension of the thread-helix to provide a pilot lug for guiding said thread into threaded engagement with said threaded neck portion of the container, said pilot lug being inclined relative to a transverse plane of the cap at an angle substantially equal to the pitch angle of said thread.

References Cited in the file of this patent

UNITED STATES PATENTS

| | | |
|---|---|---|
| 1,481,961 | Hammer | Jan. 29, 1924 |
| 1,554,748 | Merolle | Sept. 22, 1925 |